US008074563B2

(12) United States Patent
Bowles et al.

(10) Patent No.: US 8,074,563 B2
(45) Date of Patent: Dec. 13, 2011

(54) GRIDDLE WITH A HEAT SPREADER

(75) Inventors: Howard Richard Bowles, Louisville, KY (US); John Adam Yantis, Louisville, KY (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 12/362,192

(22) Filed: Jan. 29, 2009

(65) Prior Publication Data

US 2010/0186603 A1    Jul. 29, 2010

(51) Int. Cl.
*A47J 37/10* (2006.01)
*A47J 27/62* (2006.01)
(52) U.S. Cl. .............................. 99/422; 99/321; 219/436
(58) Field of Classification Search ............ 99/331–333, 99/422–425; 219/436, 461–465, 467, 476, 219/458, 442, 540, 546, 548, 552
See application file for complete search history.

(56) References Cited

U.S. PATENT DOCUMENTS

| 5,413,032 A | * | 5/1995 | Bruno et al. | 99/331 |
| 5,553,531 A | * | 9/1996 | Brown | 99/340 |
| 5,964,145 A | * | 10/1999 | Brown | 99/422 |

FOREIGN PATENT DOCUMENTS

EP    0697185 A1    2/1996

* cited by examiner

*Primary Examiner* — Ken Nguyen
(74) *Attorney, Agent, or Firm* — Global Patent Operation; Douglas D. Zhang

(57) ABSTRACT

A griddle for a cooking appliance is disclosed. The griddle includes a griddle plate of a first material having a first thermal conductivity; a heat spreading plate of a second material having a second thermal conductivity which is greater than the first thermal conductivity; and at least one clamping member for clamping the griddle plate and the heat spreading plate together.

20 Claims, 5 Drawing Sheets

GRIDDLE WITH A HEAT SPREADER

BACKGROUND OF THE INVENTION

The present invention relates generally to an accessory for a cooking appliance. More particularly, the present invention relates to a griddle with a heat spreader for a cooking appliance such as a cooking range or a cooktop.

Griddles are widely used on cooking appliances such as cooking ranges and cooktops. As is known in the art, a cooking range or a cooktop typically has at least one surface heating unit. A griddle, which is typically placed above one or more surface heating units of a cooking appliance, provides a substantially flat cooking surface. When the outer case of a cooking appliance is made of stainless steel, the griddle is often made of stainless steel as well so that the griddle matches the cooking appliance in appearance.

Stainless steel, however, does not have a very good thermal conductivity. As is known in the art, to shorten the preheat time and to improve heat distribution for such a stainless steel griddle, a heat spreader made of a relatively high thermo-conductive material, such as aluminum or copper, can be attached to the bottom surface of the stainless steel griddle plate of the griddle. The heat spreader can be metallically bonded or clad to the stainless steel griddle plate. However, the resulting clad griddle has certain disadvantages. For example, the clad griddle is relatively expensive to make. In addition, when an aluminum heat spreader is clad with a stainless steel griddle plate, there will be stresses between the aluminum heat spreader and the stainless steel griddle plate when the clad griddle is heated, due to the different coefficients of thermal expansion of these materials. Such stresses cause the clad griddle to bow, and may eventually break the bond between the aluminum heat spreader and the stainless steel griddle plate.

Therefore, it would be desirable to provide a griddle which is relatively inexpensive to make, and which has a stainless steel griddle plate and a heat spreader, but the stress between the griddle plate and the heater spreader is substantially reduced when the griddle is heated.

BRIEF DESCRIPTION OF THE INVENTION

As described herein, the exemplary embodiments of the present invention overcome one or more of the above or other disadvantages known in the art.

One aspect of the present invention relates to a griddle for a cooking appliance. The griddle includes a griddle plate of a first material having a first thermal conductivity; a heat spreading plate of a second material having a second thermal conductivity which is greater than the first thermal conductivity; and at least one clamping member for clamping the griddle plate and the heat spreading plate together.

Another aspect of the present invention relates to a griddle for a cooking appliance. The griddle includes a griddle plate of a first material having a first thermal conductivity, the griddle plate having a cooking surface and a non-cooking surface opposite the cooking surface; a heat spreading plate of a second material having a second thermal conductivity which is greater than the first thermal conductivity, the heat spreading plate comprising a top surface; and at least one clamping member for clamping the griddle plate and the heat spreading plate together so that one of the non-cooking surface and the top surface faces and substantially covers the other of the non-cooking surface and the top surface.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

Figure 1:
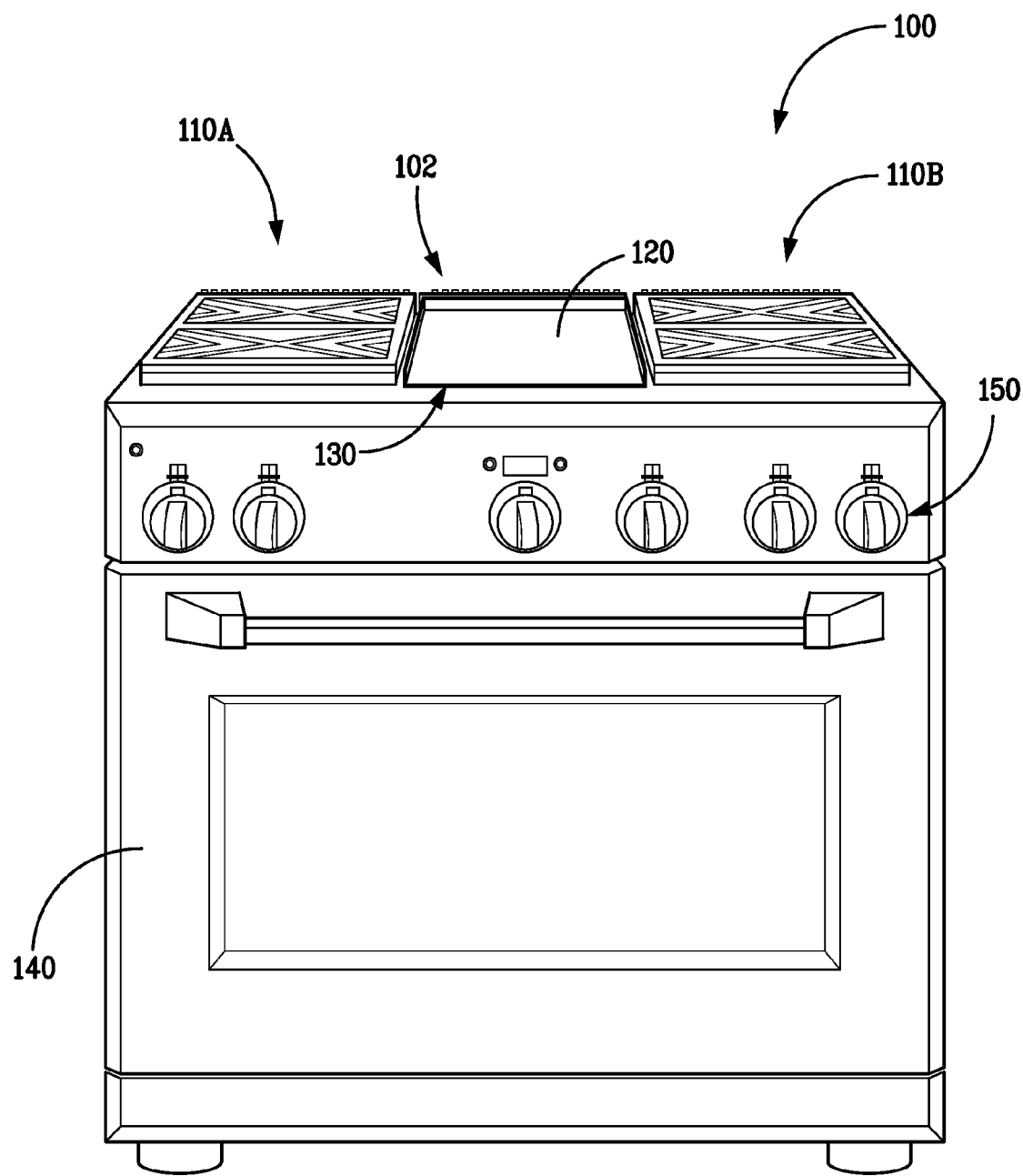
FIG. 1 is a perspective view, showing a cooking range and an exemplary embodiment of a griddle in accordance with the present invention.

FIG. 1 shows a cooking appliance 100 with an exemplary griddle 120. In this example, the cooking appliance 100 is shown as a free standing cooking range, but in alternate embodiments the cooking appliance may be, for example, any suitable cooking appliance having surface heating units including, but not limited to, free standing gas and/or electric cooking ranges, cabinet mounted cooktops and portable grilling units.

The cooking appliance 100 has, as a non-limiting example, a cook top 102 having two or more surface heating units 110A, 110B, an oven 140, and a plurality of control knobs 150 (and/or corresponding switches, not shown) for controlling the operation of the surface heating units 110A, 110B, the oven 140 and/or other suitable features of the appliance 100. The surface heating units 110A, 110B may be any suitable heating units such as, for example, gas or electric heating units.

The cooking appliance 100 also has the griddle 120 and a cooking byproduct collection area 130 for collecting, for example, grease or other cooking byproducts (e.g., oils and other fluids) produced while grilling foods on the griddle 120. A collection lip 151 (FIG. 2) is used to direct substantially all of the cooking byproducts on the griddle 120 into a trough (not shown) located in a sump (not shown) of the cooking byproduct collection area 130. The collection lip is discussed in detail in the commonly owned application Ser. No. 12/342,429, the content of which is incorporated herein by reference.

As illustrated in FIGS. 2-5, the griddle 120 includes a griddle plate 200 made of a first material having a first thermal conductivity and a first coefficient of thermal expansion. In this embodiment, the first material is stainless steel. The griddle plate 200 includes a generally rectangularly shaped main plate 201, a back sidewall 202, and two lateral sidewalls 203. The main plate 201 has a top, cooking surface 201C and a bottom, non-cooking surface 201U which is opposite the cooking surface 201C. In this embodiment, the back sidewall 202 and the lateral sidewalls 203, which are attached to the main plate 201 and to each other by welding, extend along three sides of the main plate 201 and extend upward from the main plate 201. A fourth side of the main plate 201 is thus left open, allowing the cooking byproducts in the griddle plate 200 to flow from the griddle plate 200 into the trough located in the collection area 130.

Figure 2:
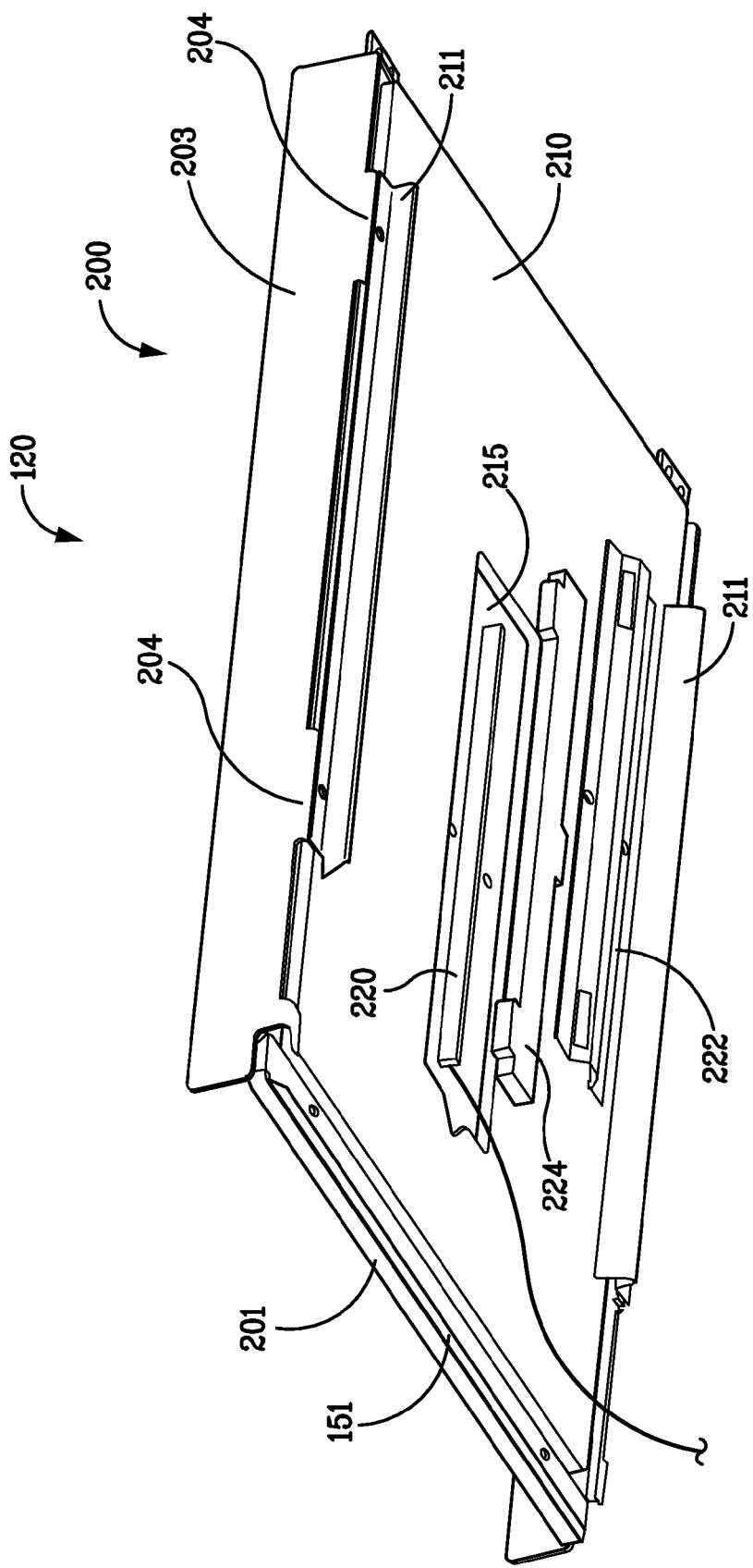
FIG. 2 is a perspective, partially exploded view of the griddle of FIG. 1; the griddle shown in FIG. 2 has a cooking byproduct collection lip.
Figure 3:
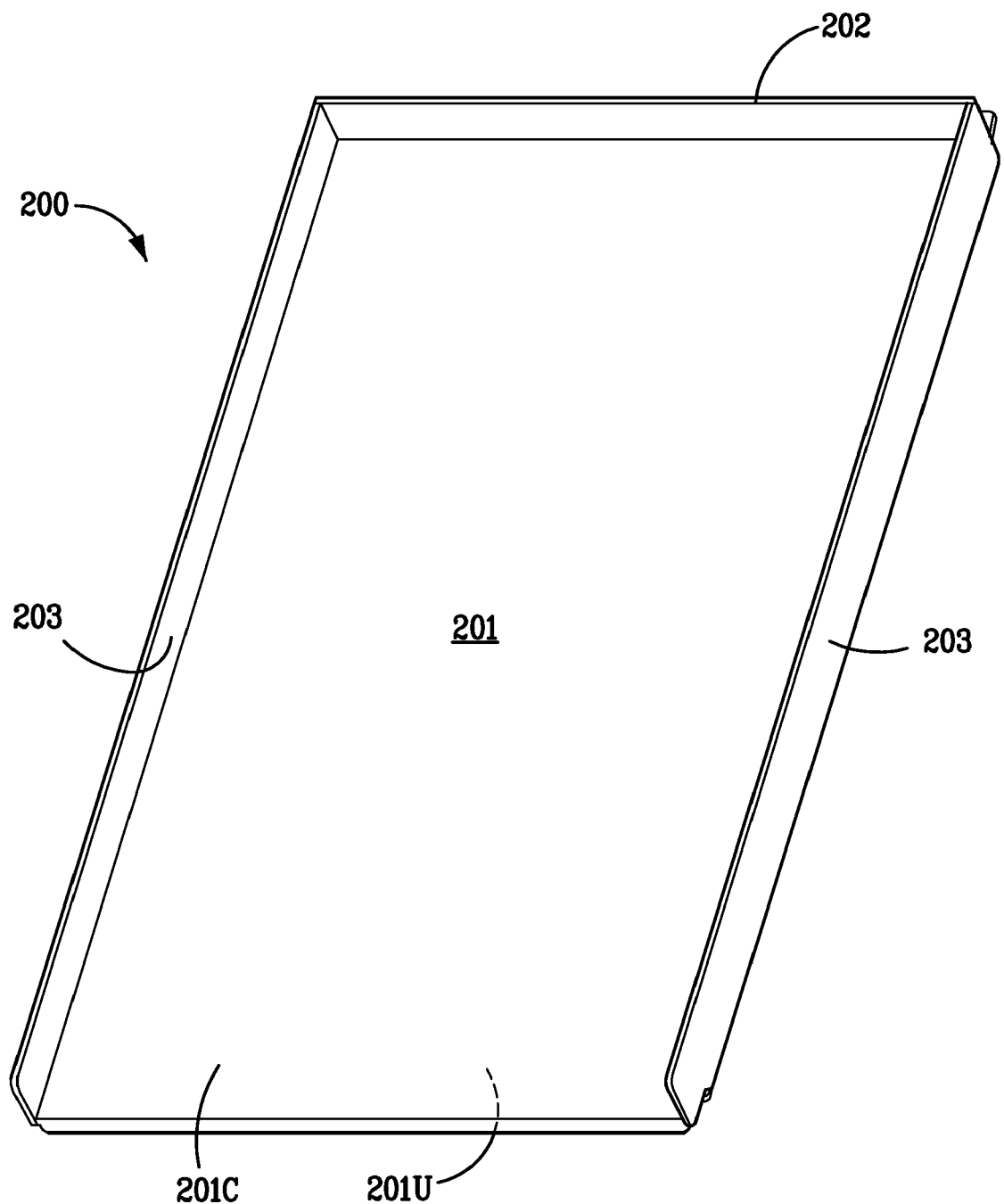
FIG. 3 is another perspective view of the griddle of FIG. 1.
Figure 4:
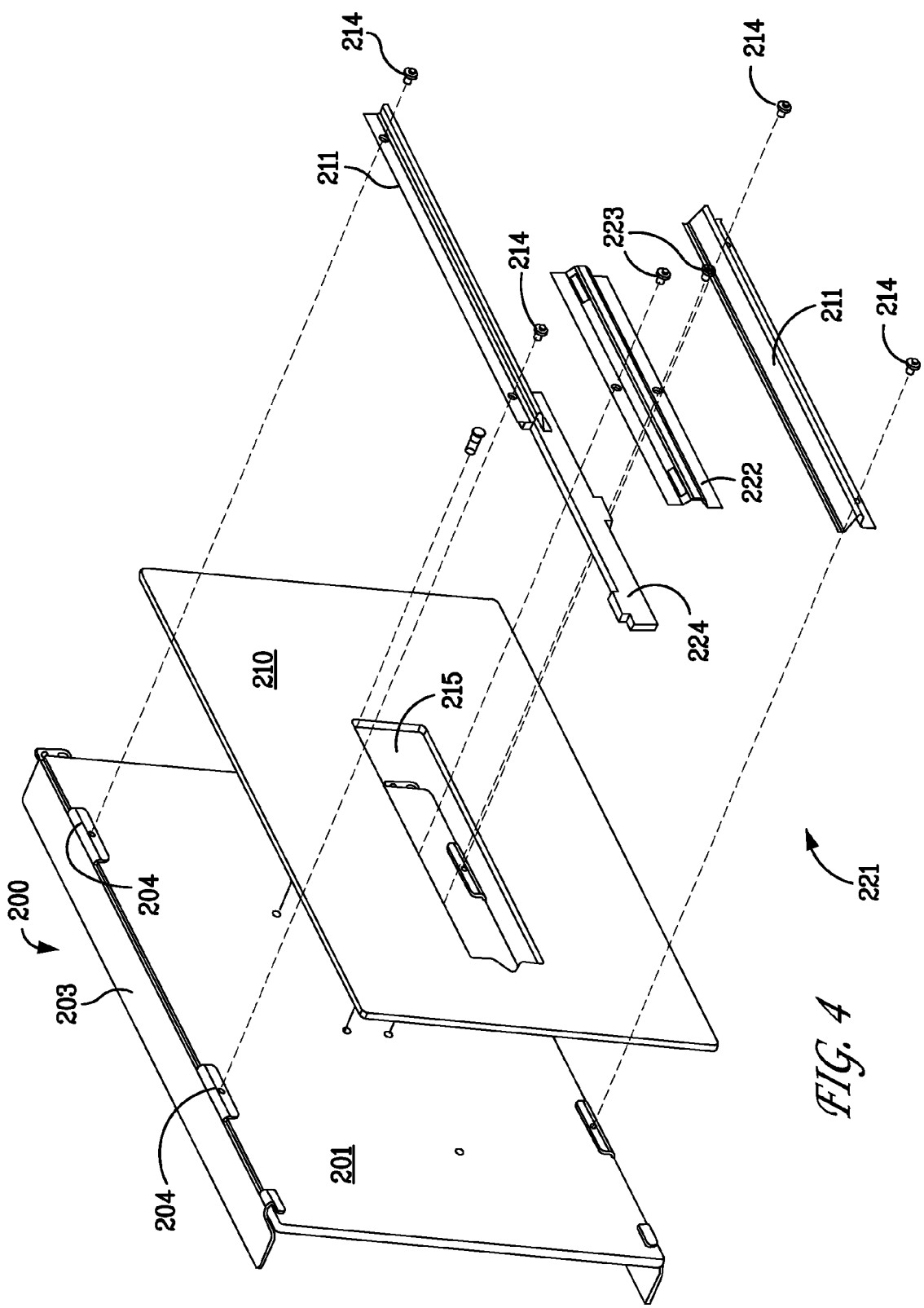
FIG. 4 is another perspective, exploded view of the griddle of FIG. 1.
Figure 5:
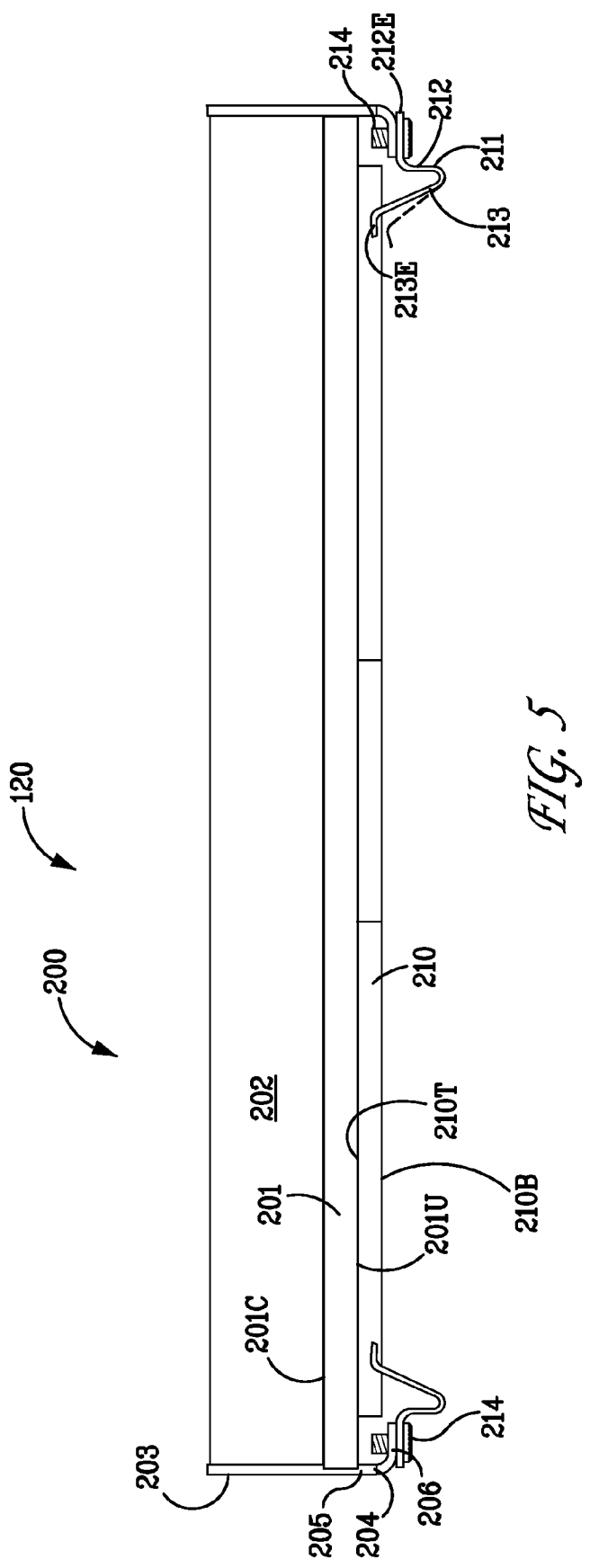
FIG. 5 is a cross-section view of the griddle of FIG. 1.

As shown in FIGS. 2, 4 and 5, two extensions 204 are preferably provided for each lateral sidewall 203. The extensions 204 are preferably made of stainless steel. Each extension 204 includes a first portion 205 extending downward from the respective sidewall 203, and a second portion 206 extending inward from the first portion 205. As illustrated in FIG. 5, the first portion 205 and the second portion 206 form a generally L-shaped structure in a cross-section view. The function of the extensions 204 will be discussed below.

To shorten the preheat time and to improve the heat distribution for the griddle plate 200, a heat spreader in the nature of a generally rectangularly shaped heat spreading plate 210 is attached to the griddle plate 200. The heat spreading plate 210 is made of a second material having a second thermal conductivity, which is greater or better than the first thermal conductivity of the first material, and a second coefficient of thermal expansion, which is different from the first coefficient of thermal expansion of the first material. In this embodiment, the second material is aluminum. It can be other materials having a relatively good thermal conductivity, such as copper. The heat spreading plate 210 has opposite top surface 210T and bottom surface 210B.

As clearly shown in FIGS. 2, 4 and 5, the griddle plate 200 and the heat spreading plate 210 are clamped together by at least one clamping member so that one of the non-cooking surface 201U and the top surface 210T faces and substantially covers the other of the non-cooking surface 201U and the top surface 210T. In this embodiment, two clamping members 211 are used. Each clamping member 211 includes a first section 212 and a second section 213. The first section 212 has a bent end 212E. The second section 213 has a curved end 213E. Each clamping member 211 is preferably made of stainless steel, and is configured so that when the bent end 212E is fixedly attached to the second portion 206 of the respective extension 204 by screw 214, for example, the curved end 213E contacts the bottom surface 210B of the heat spreading plate 210 to press the heat spreading plate 210 against the main plate 201 of the griddle plate 200. The pressing or clamping force is such that it does not generate substantial stresses between the main plate 201 and the heat spreading plate 210 so that the griddle will not bow when the heat spreading plate 210 expands or contracts longitudinally and transversely relative to the main plate 201. In FIG. 5, the original shape of the cross section of the clamping member 211 is shown in solid line; the dot line indicates the actual shape of the cross section of the clamping member 211 after the clamping member 211 is used to clamp the main plate 201 and the heat spreading plate 210 together. Since the main plate 201 and the heat spreading plate 210 are made of materials with different coefficients of thermal expansion, they expand or contract at different rates. The curved ends 213E allow the heat spreading plate 210 to expand or contract relatively easily relative to the main plate 201 of the griddle plate 200, both longitudinally and transversely, when the griddle 120 is heated or cooled. Preferably, the heat spreading plate 210 has a width which is smaller than that of the main plate 201 and the second portions 206 of the extensions 204 are disposed below the bottom surface 210B of the heat spreading plate 210 so that neither the extensions 204 nor the screws 214 would interface with the expansion of the heat spreading plate 210.

Referring now to FIGS. 2 and 4, preferably the heat spreading plate 210 has a generally centrally located, elongated through opening 215. A thermostat bulb 220 of a thermostat assembly 221 is received in the opening 215 and held against the main plate 210 by a mounting bracket 222 which is in turn attached or mounted to the main plate 210 by screws 223, for example. Preferably a thermal insulation member 224 is disposed between the thermostat bulb 220 and the mounting bracket 222 so that the thermostat bulb 220 can sense the temperature of the main plate 210 accurately without any substantially adverse influence from the surface heating unit underneath the mounting bracket 222. The function of the thermostat bulb 220 is known in the art, and therefore will not be discussed in detail here.

While the invention has been described in terms of various specific embodiments, those skilled in the art will recognize that the invention can be practiced with modification within the spirit and scope of the claims. Moreover, features of various embodiments/variations can be combined. Thus, while there have shown, described and pointed out fundamental novel features of the invention as applied to various specific embodiments thereof, it will be understood that various omissions, substitutions and changes in the form and details of the devices illustrated and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A griddle for a cooking appliance, comprising:
   a griddle plate of a first material comprising a first thermal conductivity;
   a heat spreading plate of a second material comprising a second thermal conductivity which is greater than the first thermal conductivity; and
   at least one clamping member for clamping the griddle plate and the heat spreading plate together,
   wherein the at least one clamping member comprises a first section and a second section, the at least one clamping member being configured so that when the first section is fixedly attached to the griddle plate, the second section presses the heat spreading plate against the griddle plate.

2. The griddle of claim 1, wherein the first material has a first coefficient of thermal expansion, the second material having a second coefficient of thermal expansion which is different from the first coefficient of thermal expansion.

3. The griddle of claim 2, wherein the first material comprises stainless steel.

4. The griddle of claim 3, wherein the second material comprises copper or aluminum.

5. The griddle of claim 1, wherein the heat spreading plate comprises a through opening, the griddle further comprising a thermostat assembly comprising a thermostat bulb disposed in the opening and held against the griddle plate.

6. A griddle for a cooking appliance, comprising:
   a griddle plate of a first material comprising a first thermal conductivity, the griddle plate comprising a cooking surface and a non-cooking surface opposite the cooking surface;
   a heat spreading plate of a second material comprising a second thermal conductivity which is greater than the first thermal conductivity, the heat spreading plate comprising a top surface and a bottom surface; and at least one clamping member for clamping the griddle plate and the heat spreading plate together so that one of the non-cooking surface and the top surface faces and substantially covers the other of the non-cooking surface and the top surface, wherein the at least one clamping member comprises a first section and a second section, the at least one clamping member being configured so that when the first section is fixedly attached to the griddle plate, the second section contacts the bottom surface of the heat spreading plate to press the heat spreading plate against the griddle plate.

7. The griddle of claim 6, wherein the first material has a first coefficient of thermal expansion, the second material having a second coefficient of thermal expansion which is different from the first coefficient of thermal expansion.

8. The griddle of claim 7, wherein the first material comprises stainless steel.

9. The griddle of claim 8, wherein the second material comprises copper or aluminum.

10. The griddle of claim 6, wherein the heat spreading plate further comprises an elongated through opening, the griddle further comprising a thermostat assembly comprising a thermostat bulb which is disposed in the opening and held against the griddle plate.

11. The griddle of claim 10, wherein the opening is substantially centrally located.

12. The griddle of claim 10, wherein the thermostat assembly further comprises a mounting bracket attached to the griddle plate for holding thermostat bulb against the griddle plate.

13. The griddle of claim 12, wherein the thermostat assembly further comprises a thermal insulation member disposed between the thermostat bulb and the mounting bracket.

14. The griddle of claim 6, wherein the second section comprises a curved end which contacts the bottom surface of the heat spreading plate.

15. The griddle of claim 6, wherein the griddle plate comprises two lateral sides, the at least one clamping member comprising only two clamping members, each clamping member comprising a first section and a second section, the each clamping member being configured so that when the first section is fixedly attached to a respective lateral side of the griddle plate, the second section contacts the bottom surface of the heat spreading plate to press the heat spreading plate against the griddle plate.

16. The griddle of claim 6, wherein the second section comprises a curved end which contacts the bottom surface of the heat spreading plate.

17. A griddle for a cooking appliance, comprising:

a griddle plate of a first material comprising a first thermal conductivity, the griddle plate comprising a cooking surface and a non-cooking surface opposite the cooking surface;

a heat spreading plate of a second material comprising a second thermal conductivity which is greater than the first thermal conductivity, the heat spreading plate comprising a top surface and an elongated through opening;

at least one clamping member for clamping the griddle plate and the heat spreading plate together so that one of the non-cooking surface and the top surface faces and substantially covers the other of the non-cooking surface and the top surface; and a thermostat assembly comprising a thermostat bulb disposed in the opening, and a mounting bracket attached to the griddle plate for holding the thermostat bulb against the griddle plate.

18. The griddle of claim 17, wherein the thermostat assembly further comprises a thermal insulation member disposed between the thermostat bulb and the mounting bracket.

19. The griddle of claim 17, wherein the first material has a first coefficient of thermal expansion, the second material having a second coefficient of thermal expansion which is different from the first coefficient of thermal expansion.

20. The griddle of claim 17, wherein the first material comprises stainless steel, and the second material comprises copper or aluminum.

* * * * *